(12) United States Patent
Yamori et al.

(10) Patent No.: US 8,364,019 B2
(45) Date of Patent: Jan. 29, 2013

(54) VIDEO DECODING DEVICE AND VIDEO DECODING METHOD

(75) Inventors: Akihiro Yamori, Kawasaki (JP); Akira Nakagawa, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 357 days.

(21) Appl. No.: 12/782,975

(22) Filed: May 19, 2010

(65) Prior Publication Data

US 2010/0303370 A1 Dec. 2, 2010

(30) Foreign Application Priority Data

May 26, 2009 (JP) ................................ 2009-126550

(51) Int. Cl.
*H04N 5/94* (2006.01)
(52) U.S. Cl. ...................... 386/263; 386/264; 386/265
(58) Field of Classification Search ................. 386/263, 386/265

See application file for complete search history.

(56) References Cited

FOREIGN PATENT DOCUMENTS

| JP | 2006-203598 | 8/2006 |
|----|-------------|--------|
| JP | 2007-325206 | 12/2007 |

*Primary Examiner* — Jamie Atala
(74) *Attorney, Agent, or Firm* — Staas & Halsey LLP

(57) ABSTRACT

A video decoding device includes a decoder configured to decode a plurality of separate partial areas of each of pictures included in encoded video data and a motion vector indicating a positional relationship between each of the partial areas and a partial area of a different picture referenced in order to encode the partial area; an error detector configured to detect, as an error area, a partial area that is unable to be decoded by the decoder from among the plurality of partial areas; a referenced area determiner configured to determine a referenced area of a third picture that has already been decoded, the referenced area corresponding to the error area; a concealment unit configured to conceal the error area using data included in the referenced area; and an image integrator configured to reproduce the first picture.

20 Claims, 8 Drawing Sheets

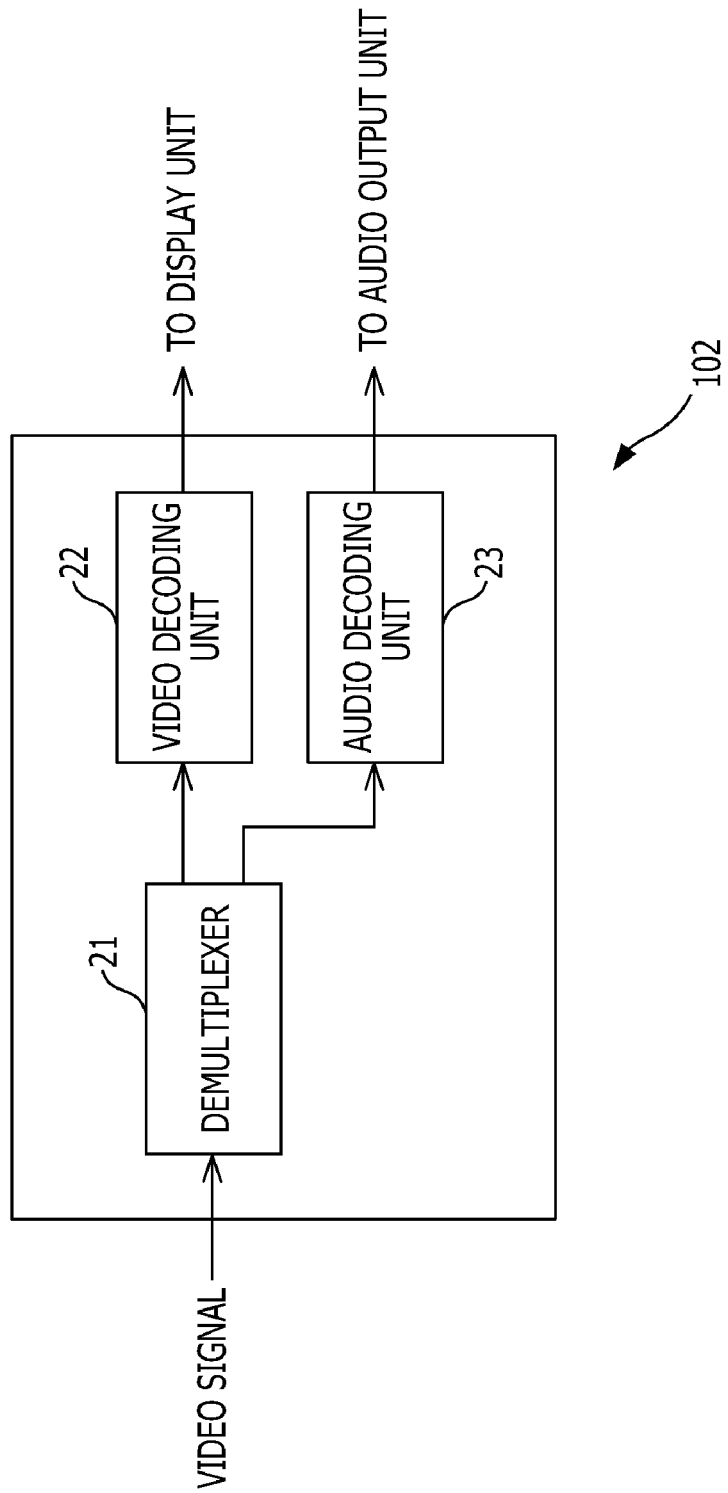

VIDEO DECODING DEVICE AND VIDEO DECODING METHOD

CROSS-REFERENCE TO RELATED APPLICATIONS

This application is based upon and claims the benefit of priority of the prior Japanese Patent Application No. 2009-126550 filed on May 26, 2009, the entire contents of which are incorporated herein by reference.

BACKGROUND OF THE INVENTION

1. Field

A certain aspect of the embodiment disclosed herein relates to a video decoding device and a video decoding method for decoding video data that includes a plurality of pictures, one of which is encoded by referencing another.

2. Description of the Related Art

Video decoding devices have been used to decode video data that was encoded to reduce the amount of data. However, in some cases, a video decoding device cannot acquire some of video data. For example, a television receiver or a mobile terminal that receives encoded video data distributed using radio waves and decodes the video data may fail to receive some of the video data due to the condition under which the radio waves are received. In such a case, the video decoding device cannot correctly decode a picture corresponding to the unreceived and lost data. In particular, when video data is encoded using an inter coding method in which a picture is encoded using information regarding the previous and next pictures, the video decoding device cannot decode a picture that refers to the picture corresponding to the lost data as well.

Accordingly, an error concealment technology has been developed. In error concealment technology, a pseudo picture or a pseudo area is reconstructed for an error picture or an error area of a picture corresponding to lost data using the information regarding an area of a non-lost picture or a non-lost picture.

For example, Japanese Laid-open Patent Publication No. 2006-203598 describes a digital image decoding apparatus that determines whether an image is a panned image and detects an error block that includes an error. When the digital image decoding apparatus determines that a target image is a panned image and if the digital image decoding apparatus detects an error block, the digital image decoding apparatus generates a motion vector for motion compensation for the error block on the basis of motion vectors of a plurality of normal blocks located in the vicinity of the erroneous block. Alternatively, Japanese Laid-open Patent Publication No. 2007-325206 describes a video decoding device that determines the validity of macroblocks located in the vicinity of a macroblock to be recovered. Thereafter, the video decoding device acquires context information for image recovery from the nearby macroblocks that have been determined to be valid and computes an estimated motion vector used for recovering the macroblock to be recovered. Subsequently, the video decoding device acquires a decoded image from a decoded frame using the computed motion vector and generates a recovered image.

In these error concealment technologies, in order to determine areas of a picture used for concealing an area having an error, a motion vector that indicates an area of a different picture including an image similar to the image of the areas in the vicinity of the area having an error is used. Accordingly, in such error concealment technologies, if a motion vector of an area in which an error occurred is correctly estimated, the area in which an error occurred may be generated by interpolating an image similar to an original image in the area.

However, the motion of an image in an area in which an error occurred frequently differs from the motion of an image in an area in the vicinity of the area in which an error occurred. Therefore, in such error concealment technologies, in some cases, it is difficult to correctly estimate the motion of the image in the area in which an error occurred. In particular, when an area in which an error occurred is large and, therefore, the area includes a plurality of macroblocks used for estimating the motion vector, images in the macroblocks included in the area in which an error occurred may move in different directions. Accordingly, the image in an error concealment area may not match the images in areas in the vicinity of the error concealment area and, therefore, the image quality of a picture including the error concealment area may be significantly decreased.

SUMMARY

In accordance with an aspect of the embodiments, a video decoding device includes a decoder configured to decode a plurality of separate partial areas of each of pictures included in encoded video data and a motion vector indicating a positional relationship between each of the partial areas and a partial area of a different picture referenced in order to encode the partial area; an error detector configured to detect, as an error area, a partial area that is unable to be decoded by the decoder from among the plurality of partial areas; a referenced area determiner configured to, when the error area is included in a first picture, determine, using the motion vector of a partial area included in a second picture that is subsequent to the first picture in the order in which the pictures are decoded, a referenced area of a third picture that has already been decoded, the referenced area corresponding to the error area; a concealment unit configured to conceal the error area using data included in the referenced area; and an image integrator configured to reproduce the first picture by arranging the concealed error area and the decoded partial areas included in the first picture in a predetermined order.

The object and advantages of the invention will be realized and attained by means of the elements and combinations particularly pointed out in the claims. It is to be understood that both the foregoing general description and the following detailed description are exemplary and explanatory and are not restrictive of the various embodiments, as claimed.

The above-described embodiments of the present invention are intended as examples, and all embodiments of the present invention are not limited to including the features described above.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 is a block diagram of a signal processing unit included in the video reproduction apparatus shown in FIG. 7.

DETAILED DESCRIPTION OF THE PREFERRED EMBODIMENTS

Figure 1:
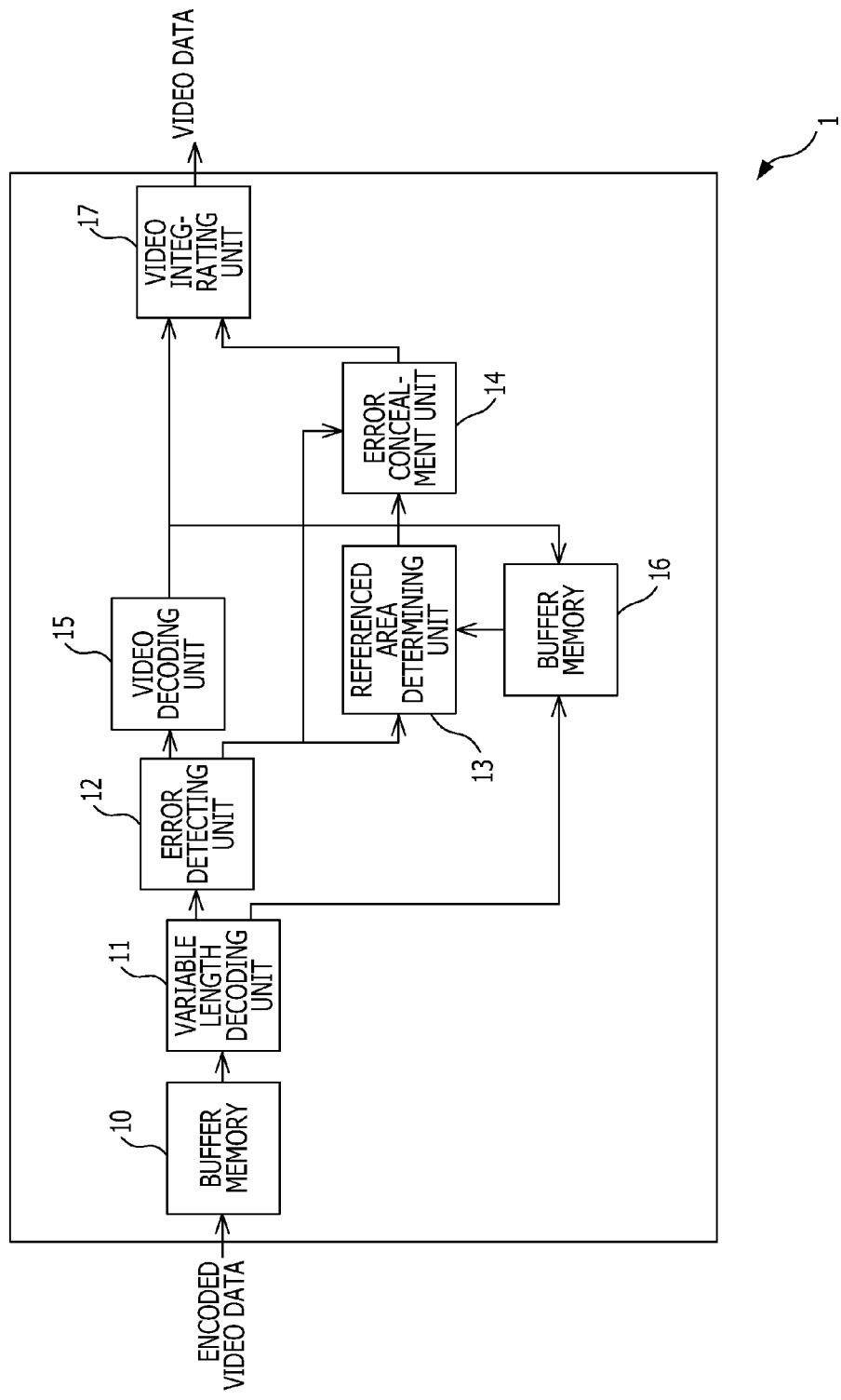
FIG. 1 is a block diagram of a video decoding device according to an embodiment.

Reference may now be made in detail to embodiments of the present invention, examples of which are illustrated in the accompanying drawings, wherein like reference numerals refer to like elements throughout.

A video decoding device according to an embodiment is described below. According to a certain aspect of the embodiment, if an error occurred in one of pictures included in input encoded video data, the video decoding device extracts the motion vector of a picture that references an area of the picture in which the error occurred. Thereafter, the video decoding device estimates, using the extracted motion vector, an area of a decoded picture that is similar to the area in which an error occurred and conceals the area in which the error occurred using the data of the estimated area.

Note that a picture included in encoded video data to be decoded may be a field acquired using an interlace method or a frame acquired using a progressive method. In addition, encoded video data to be decoded may be video data encoded using any encoding standard that uses an encoding method for encoding a picture to be encoded by performing motion compensation from the preceding and succeeding pictures. The encoded video data may be video data encoded using, for example, Moving Picture Expert Group phase 2 (MPEG-2), MPEG-4, or H.264 MPEG-4 Advanced Video Coding (H.264 MPEG-4 AVC). In addition, each of the pictures included in the encoded video data is intra-encoded or inter-encoded on a per GOP (Group of Pictures) basis. Note that in an intra-coding method, a picture is encoded using only information included in the picture to be encoded. In contrast, in an inter-coding method, a picture is encoded using information on a picture preceding the picture to be encoded and information on a picture succeeding the picture to be encoded. According to the present embodiment, a GOP pattern has a so-called IBBP structure that includes a B picture that is bi-directionally predictive-encoded using a picture to be intra-coded and temporally preceding and succeeding pictures and a P picture that is forward predictive encoded using the information on a temporally preceding picture. However, a GOP structure applied to video data to be decoded by the video decoding device may have a different structure, such as an IPPP structure that does not include a B picture.

FIG. 1 is a block diagram of a video decoding device 1 according to an embodiment. As shown in FIG. 1, the video decoding device 1 includes buffer memories 10 and 16, a variable length decoder 11, an error detector 12, a referenced area determiner 13, an error concealment unit 14, an image decoder 15, and an image integrator 17. Such units included in the video decoding device 1 may be in the form of separate circuits. Alternatively, the units may be an integrated circuit including circuits providing the functions of the units of the video decoding device 1. Still alternatively, the units of the video decoding device 1 may be function modules realized by computer programs executed by one or more processors included in the video decoding device 1.

The buffer memory 10 temporarily stores input encoded video data. After the amount of the data accumulated in the buffer memory 10 reaches a predetermined default amount, data for one picture is sequentially read from the buffer memory 10 in accordance with the order in which pictures are decoded. The readout data is input to the variable length decoder 11.

The variable length decoder 11 decodes variable length encoded information for each of pictures included in the encoded video data using a predetermined variable length decoding method. The variable length decoding method corresponds to the encoding method applied to the encoded video data. For example, a decoding method used for Huffman code or arithmetic code may be used as the variable length decoding method. Thereafter, the variable length decoder 11 reproduces encoded data, such as a quantized frequency coefficient and a quantizer scale, and a motion vector for each of the macroblocks. Subsequently, the variable length decoder 11 delivers, to the error detector 12, the variable-length decoded encoded data and motion vector and various information accompanied with the decoded data and motion vector for each of the macroblocks. In addition, the variable length decoder 11 temporarily stores the motion vector of each of the macroblocks in the buffer memory 16 together with the macroblock address of the macroblock and the identification number of a picture that includes the macroblock.

At that time, in accordance with the decoding order, the variable length decoder 11 variable-length decodes variable-length encoded information of a picture preceding, by a predetermined number of pictures greater than or equal to two, the picture decoded by the image decoder 15 and for which the referenced area determiner 13 determines a referenced area in order to perform error concealment. In this way, as described below, in order to determine a referenced area, the video decoding device 1 may use a motion vector obtained for a macroblock included in a picture that is decoded after the picture to be subjected to error concealment is decoded. Note that the predetermined number of pictures is determined so as to be a value in the range from 2 to the number of pictures that may refer to the picture to be subjected to error concealment plus one.

Figure 2:
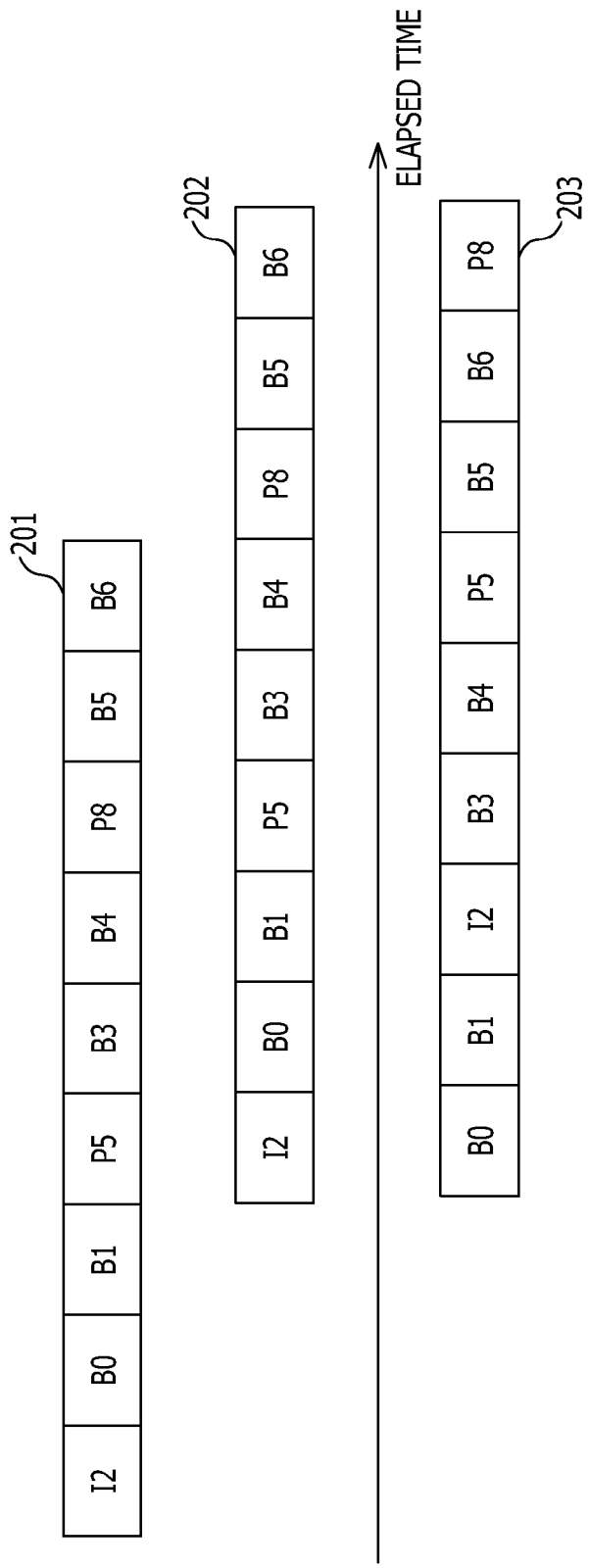
FIG. 2 is a schematic illustration of a relationship between a time at which variable-length decoding is performed and a time at which image decoding is performed.

FIG. 2 is a schematic illustration of a relationship between a time at which variable-length decoding is performed and a time at which image decoding is performed. In FIG. 2, the abscissa represents an elapsed time. In addition, a block line 201 represents the time for some of video data to be subjected to variable length decoding performed by the variable length decoder 11. Each of the blocks in the block line 201 corresponds to a picture. In addition, a block line 202 represents the time at which a picture that is the same as the picture indicated by the block line 201 is decoded by the image decoder 15 or is processed by the referenced area determiner 13. Furthermore, a block line 203 represents pictures indicated by the block lines 201 and 202 and arranged in an order in which the pictures are reproduced. Symbols I, B, and P shown in the blocks of each of the block lines 201, 202, and 203 indicate the encoding type of the picture, that is, an I picture, a B picture, and a P picture, respectively. In addition, the number following the symbol that indicates the encoding type represents a picture number corresponding to the order in which the pictures are reproduced. As the number is smaller, the picture is reproduced earlier.

In the example shown in FIG. 2, the variable length decoder 11 performs a variable-length decoding process on a picture preceding the picture processed by the referenced area determiner 13 and the image decoder 15 by three pictures. Accordingly, the referenced area determiner 13 may use motion vectors of two pictures located after the picture subjected to error concealment in the order in which the pictures are decoded. For example, when an error concealment process is needed for a picture P5, the referenced area determiner 13 may use motion vectors of pictures B3 and B4 located after the picture P5 in the order in which the pictures are decoded. Alternatively, if the variable length decoder 11 performs a variable-length decoding process on a picture preceding a picture processed by the referenced area determiner 13 and the image decoder 15 by four pictures, the referenced area determiner 13 may use motion vectors of three pictures located after a picture subjected to error concealment in the order in which the pictures are decoded. For example, when an error concealment process is needed for a picture P5, the referenced area determiner 13 may use motion vectors of the pictures B3 and B4 and a picture P8 located after the picture P5 in the order in which the pictures are decoded.

The error detector 12 detects an area in which an error occurred for each of the pictures included in the video data. According to the present embodiment, the error detector 12 determines whether an error has occurred for each of a macroblock or a block which is a target area of motion compensation, that is, whether data needed for decoding the macroblock or the block is lost. Hereinafter, a macroblock in which an error occurred is referred to as an "error macroblock". In addition, for simplicity, a description is made with reference to the case in which a partial area of each of the pictures for which the occurrence of an error is detected is a macroblock. However, even when a partial area of each of the pictures for which the occurrence of an error is detected represents a block, processing similar to that for a macroblock may be performed for a block. For example, the error detector 12 identifies a macroblock for which the occurrence of an error is detected using the value of a macroblock address given to each of the macroblocks. Thereafter, the error detector 12 determines whether all information items defined by the standard of the encoding method and regarding the identified macroblock are present. If all information items are present, the error detector 12 determines that an error has not occurred in the macroblock. However, if any one of the information items is not present, the error detector 12 determines that an error has occurred in the macroblock.

Alternatively, the error detector 12 may determine whether a predetermined information item, such as a slice start code given to each of slices obtained by separating a picture into pieces each having a predetermined length, is present. If the information item regarding one of the slices is not present, the error detector 12 may determine that an error has occurred for all of the macroblocks included in the slice. The error detector 12 sends, to the referenced area determiner 13 and the error concealment unit 14, information regarding the macroblock address indicating the error macroblock and the identification number of a picture including the macroblock. In addition, the error detector 12 sends, to the image decoder 15, the encoded data and the motion vector of a macroblock in which an error has not occurred, the identification number of the picture that includes the macroblock, and information indicating the encoding type of the picture.

The referenced area determiner 13 determines a referenced area (a referenced macroblock) used for concealing an error macroblock notified by the error detector 12. Thereafter, from among the motion vectors stored in the buffer memory 16, the referenced area determiner 13 extracts the motion vector of a macroblock of a different picture that references the error block. Upon extracting such a motion vector, the referenced area determiner 13 reads, from the buffer memory 16, information regarding a macroblock corresponding to the motion vector. For example, if the motion vector that references the error macroblock is one of two motion vectors regarding a macroblock included in a B picture, the other motion vector is also read from the buffer memory 16. Thereafter, the referenced area determiner 13 computes a concealment vector MVC (Motion Vector Conceal) for identifying a macroblock serving as a referenced area. The concealment vector MVC has the following elements: the amounts of shift from an error macroblock to a macroblock serving as a referenced area in the horizontal and vertical directions in the pictures and the number of pictures between the pictures including the error macroblock and a picture including the referenced area.

Figure 3:
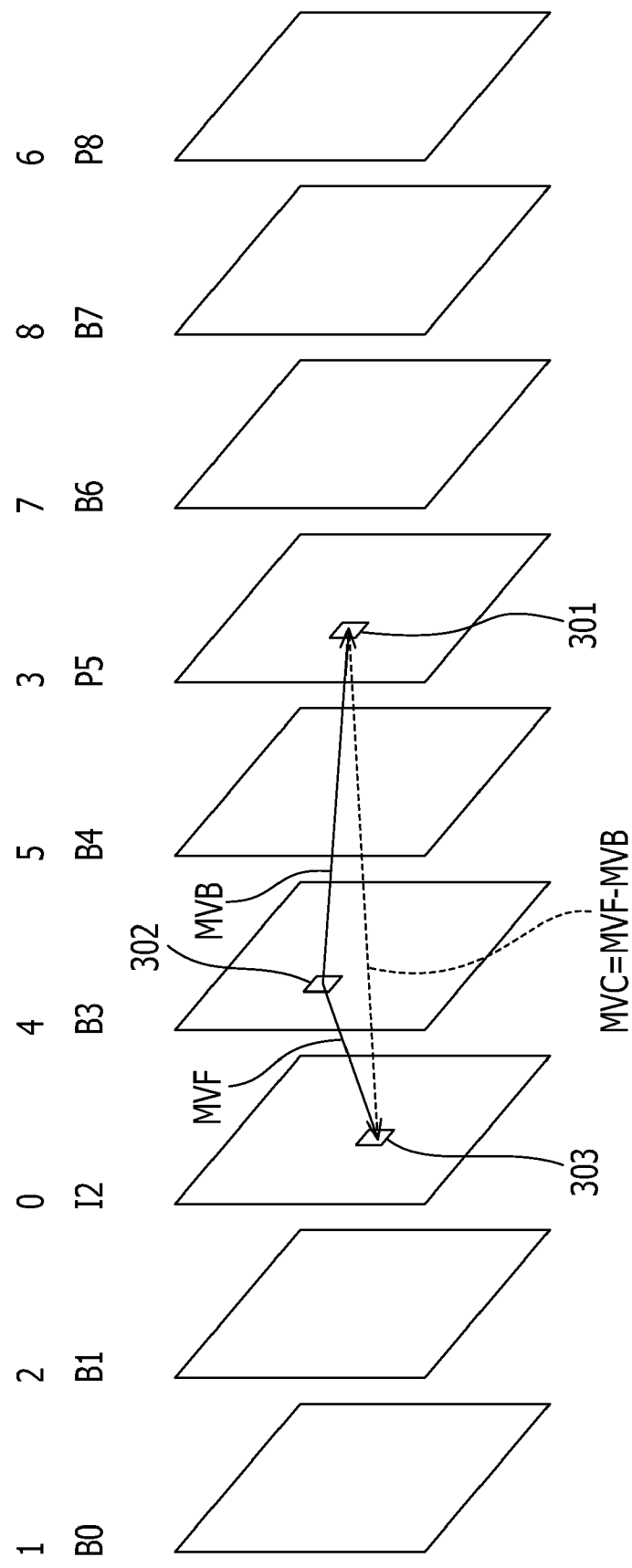
FIG. 3 illustrates an example of a correspondence between a macroblock in which an error occurred and a macroblock used for error concealment.

FIG. 3 illustrates an example of a correspondence between an error macroblock and a macroblock used for error concealment. In FIG. 3, pictures B0 to P8 are arranged in the order in which the pictures are reproduced, and the leftmost picture B0 is reproduced first. Symbols I, B, and P shown above the pictures indicate the encoding types of the pictures, that is, an I picture, a B picture, and a P picture, respectively. In addition, the number shown above the symbol indicating the encoding type represents the order in which the pictures are decoded. Suppose that in FIG. 3, an error occurred in a macroblock 301 of the picture P5, and a backward motion vector (a vector that references a temporally succeeding picture) MVB (Motion Vector Backward) of a macroblock 302 of the picture B3 references the macroblock 301. In addition, a forward motion vector (a vector that references a temporally preceding picture) MVF (Motion Vector Forward) of a macroblock 302 of the picture B3 references a macroblock 303 of the picture I2. In such a case, the image in the macroblock 302 is similar to the image in the macroblock 301 and the image in the macroblock 303. Accordingly, it is highly likely that the image in the macroblock 301 is similar to the image in the macroblock 303. That is, the macroblock 303 is suitable for a macroblock that is used for concealing the macroblock 301. Therefore, the referenced area determiner 13 computes the concealment vector MVC so that the macroblock 303 is determined to be a reference area of the macroblock 301 as follows:

$$MVC = MVF - MVB \quad (1).$$

Figure 4:
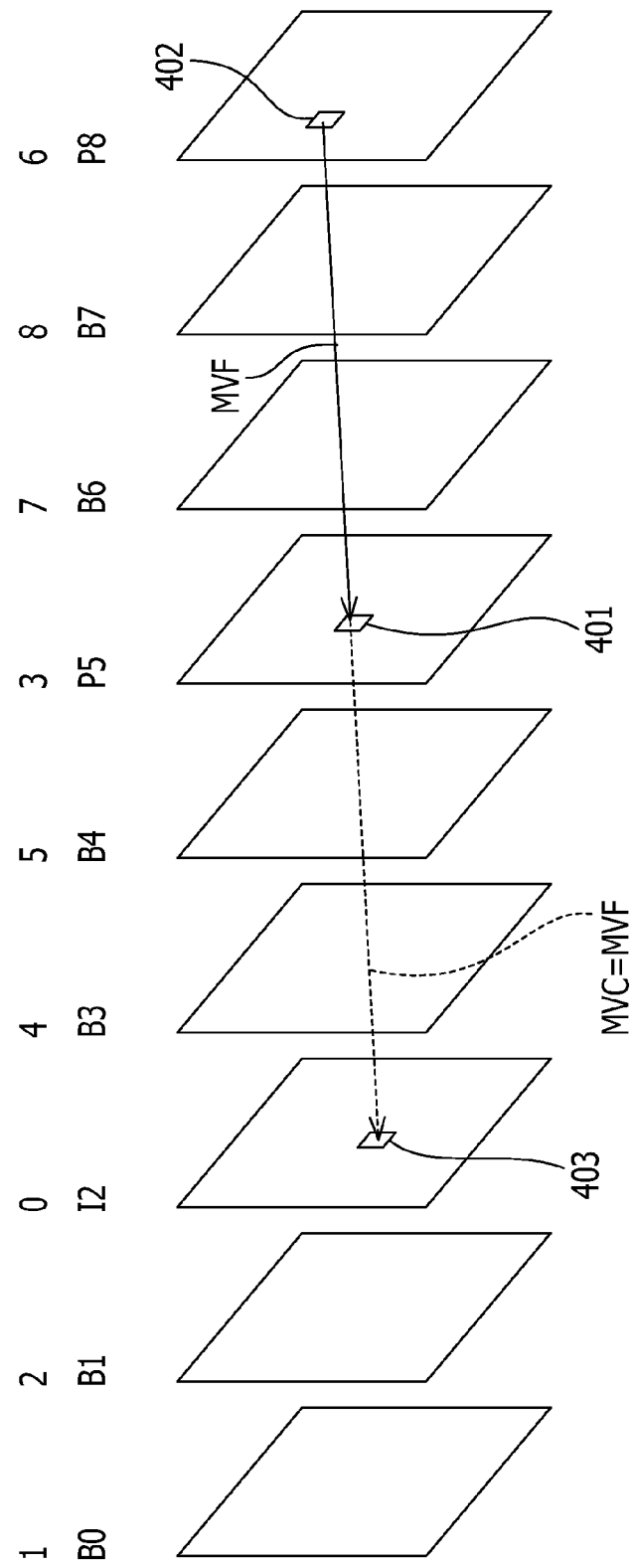
FIG. 4 illustrates another example of a correspondence between a macroblock in which an error occurred and a macroblock used for error concealment.

FIG. 4 illustrates another example of a correspondence between an error macroblock and a macroblock used for error concealment. In FIG. 4, pictures B0 to P8 are arranged in the order in which the pictures are reproduced, and the leftmost picture B0 is reproduced first. Symbols I, B, and P shown above the pictures indicate the encoding types of the pictures, that is, an I picture, a B picture, and a P picture, respectively. In addition, the number shown above the symbol indicating the encoding type represents the order in which the pictures are decoded. Suppose that in FIG. 4, an error occurred in a macroblock 401 of the picture P5, and a forward motion vector MVF of a macroblock 402 of the picture P8 references the macroblock 401. In such a case, it may be considered that the image in the macroblock 401 has been moved to the position of the macroblock 402. Therefore, it is highly likely that the image in the macroblock 401 has been moved in the same direction as the direction of the motion vector MVF of the macroblock 402 even before the picture P5. Accordingly, the referenced area determiner 13 computes the concealment vector MVC so that a macroblock 403 in the picture I2 that has already been decoded and that is located in an extension line of the forward motion vector MVF is determined to be a reference area of the macroblock 401 as follows:

$$MVC = MVF \quad (2).$$

However, the distance between an I picture and a P picture or the distance between P pictures may be variable. In such a case, the referenced area determiner 13 computes a ratio of a distance between a picture including an error macroblock and a picture including a macroblock used for error concealment to a distance between the picture including an error macroblock and a picture including a macroblock that references the error block. Thereafter, the referenced area determiner 13 may compute the concealment vector MVC by multiplying the forward motion vector MVF by the computed ratio. For example, in FIG. 4, let D1 denote the distance between the pictures P5 and P8, and let D2 denote the distance between the pictures P5 and I2. Then, the referenced area determiner 13 computes the concealment vector MVC as follows: MVC=MVF×D2/D1.

It should be noted that the pictures and the motion vectors used for computing the concealment vector MVC are not limited to those used in the above-described example. For example, in FIG. 4, suppose that the forward motion vector MVF of any one of macroblocks included in the picture B6 or B7 references the error macroblock 401. In such a case, as in equation (1), the referenced area determiner 13 may compute the concealment vector MVC using the forward motion vector MVF and the backward motion vector MVB so that MVC=MVF−MVB. In addition, in FIG. 3, if the macroblock 302 in the picture B3 does not have a forward motion vector MVF, the referenced area determiner 13 may compute the concealment vector MVC using only the backward motion vector MVB of the macroblock 302. In this case, it is considered that an image in the error macroblock 301 has been moved from the position of the macroblock 302 to the position of the macroblock 301. Accordingly, the referenced area determiner 13 determines the concealment vector MVC to be a vector that points the picture I2 and that is parallel but opposite to the backward motion vector MVB of the macroblock 301 in the picture P5 (i.e., MVC=−½×MVB).

In FIGS. 3 and 4, a picture including a macroblock for a motion vector used for computing the concealment vector MVC is located after the picture P5 that includes an error macroblock in the order in which pictures are decoded. However, as noted above, according to the present embodiment, the variable length decoder 11 may decode the motion vector for each of the macroblocks in the pictures B3, B4, and P8 before an error concealment process is performed on the picture P5. Accordingly, the referenced area determiner 13 may compute the concealment vector MVC using such motion vectors. In addition, a picture including a macroblock referenced by the concealment vector MVC is decoded before a picture including an error macroblock is decoded. Therefore, as described in more detail below, the error concealment unit 14 may conceal the error macroblock using information regarding a macroblock serving as a referenced area indicated by the concealment vector MVC computed by the referenced area determiner 13.

Note that a plurality of motion vectors that reference an error macroblock may be present. That is, a plurality of macroblocks that reference an error macroblock may be present in a picture other than the picture that includes the error macroblock. In such a case, the referenced area determiner 13 selects a macroblock including an image that is the most similar to the image in the error macroblock as follows. Thereafter, the referenced area determiner 13 determines the concealment vector MVC so that the macroblock that is selected as the most similar image serves as a referenced area.

Figure 5:
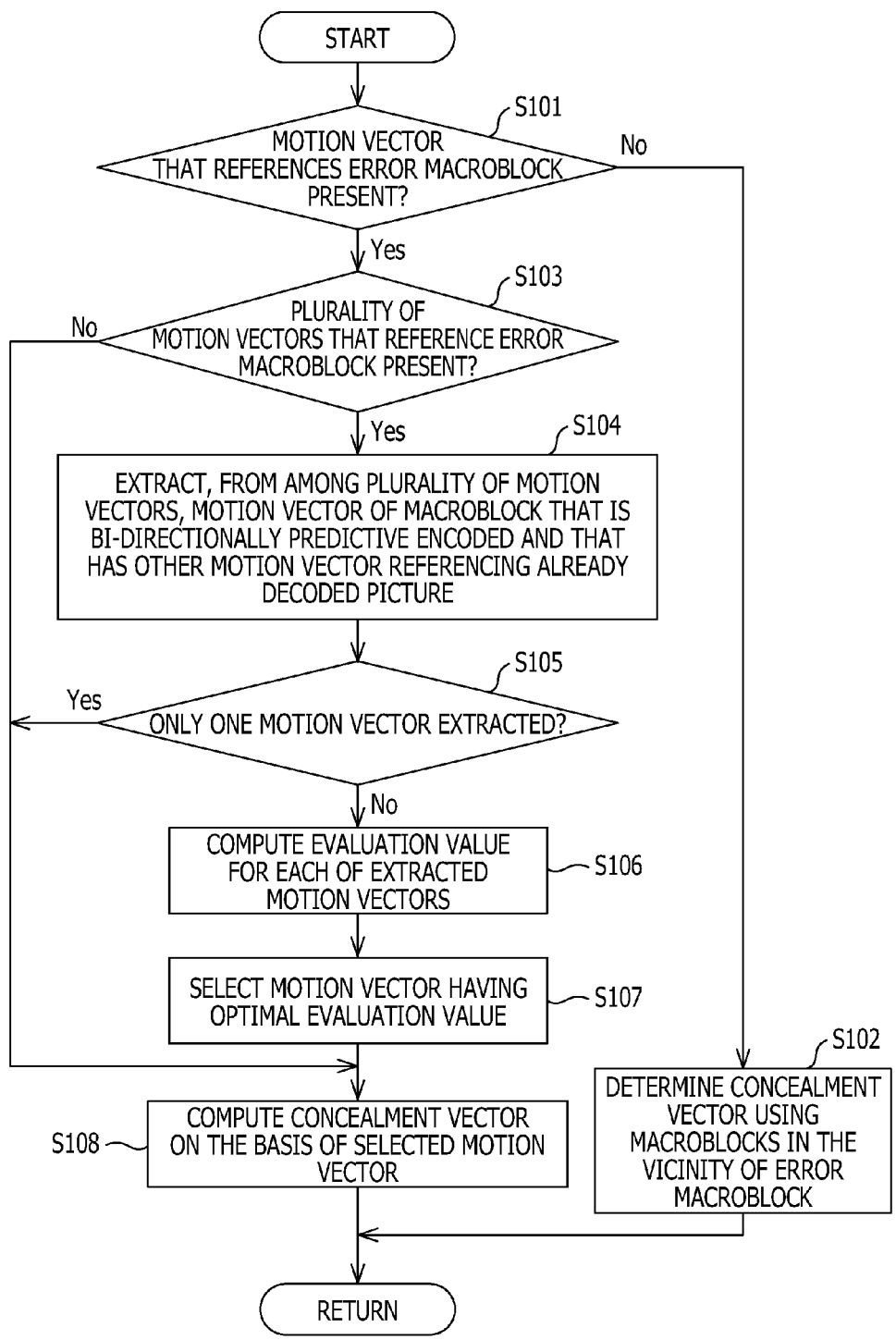
FIG. 5 is a flowchart of an exemplary process of computing a concealment vector.

FIG. 5 is a flowchart of an exemplary process of computing a concealment vector performed by the referenced area determiner 13. This process is performed each time an error macroblock is detected.

First, the referenced area determiner 13 determines whether a motion vector that references an error macroblock is present among motion vectors stored in the buffer memory 16 (operation S101). If a motion vector that references an error macroblock is not present (No in operation S101), the referenced area determiner 13 computes a concealment vector using information regarding macroblocks in the vicinity of the error block (operation S102). For example, the referenced area determiner 13 may compute a concealment vector by averaging the horizontal components of the motion vectors of the macroblocks in the vicinity of the error macroblock and averaging the vertical components of the motion vectors of the macroblocks. Alternatively, an error macroblock may be generated by interpolating the macroblocks in the vicinity of the error macroblock. In this case, the referenced area determiner 13 selects a picture including the error macroblock as a referenced picture and generates, as concealment vectors, vectors indicating the macroblocks in the vicinity of the error macroblock.

However, if a motion vector that references an error macroblock is present (Yes in operation S101), the referenced area determiner 13 determines whether a plurality of motion vectors that reference the error macroblock are present (operation S103). If only one motion vector that references the error macroblock is present (No in operation S103), the referenced area determiner 13 computes a concealment vector on the basis of the motion vector (operation S108). Note that, at that time, the method for computing a concealment vector that has already been described above is used.

However, if a plurality of motion vectors that reference the error macroblock are present (Yes in operation S103), the referenced area determiner 13 extracts the motion vector indicating a macroblock that is the most similar to the error macroblock from among the plurality of motion vectors. More specifically, when one of two motion vectors of a bi-directionally predictive encoded macroblock references the error macroblock and the other motion vector indicates an already decoded macroblock, the referenced area determiner 13 extracts such a pair of motion vectors (operation S104).

Subsequently, the referenced area determiner 13 determines whether only one pair of the motion vectors is detected in operation S104 (operation S105). If only one pair of the motion vectors is detected (Yes in operation S105), the referenced area determiner 13 computes a concealment vector on the basis of the pair of motion vectors (operation S108). In this case, the referenced area determiner 13 computes the concealment vector using equation (1) described above. However, the case in which a plurality of pairs of motion vectors are extracted or the case in which no such a pair of motion vectors is extracted (No in operation S105) may occur. In such a case, the referenced area determiner 13 computes at least one evaluation values for each of the motion vectors that reference the error macroblock using the quantized frequency coefficient of a macroblock or the quantizer scale corresponding to the motion vector (operation S106). Thereafter, the referenced area determiner 13 selects the motion vector having an optimal evaluation value (operation S107).

For example, a quantized frequency coefficient of each of the macroblocks having a motion vector is obtained by quantizing a frequency coefficient obtained through a frequency conversion process performed on a difference image between the macroblock and a referenced macroblock indicated by the motion vector. Accordingly, as the two macroblocks become more similar, a variation in the difference values between the pixels decrease. Therefore, as the two macroblocks become more similar, the number of quantized frequency coefficients having a value of zero increases. Thus, the referenced area determiner 13 computes the number of quantized frequency coefficients having a non-zero value as a first evaluation value for each of the macroblocks that reference the error macroblock. Thereafter, the referenced area determiner 13 selects a macroblock that minimizes the first evaluation value, that is, a macroblock having the least number of the quantized frequency coefficients having a non-zero value. Thereafter, the referenced area determiner 13 computes a concealment vector using the motion vector of the macroblock having the least number of the quantized frequency coefficients having a non-zero value.

In addition, if a plurality of macroblocks having the least number of non-zero quantized frequency coefficients are present, the referenced area determiner 13 uses the quantizer scale as a second evaluation value. Then, the referenced area determiner 13 selects a macroblock that minimizes the second evaluation value, that is, a macroblock that minimizes the quantizer scale from among the macroblocks. Thereafter, the referenced area determiner 13 computes a concealment vector on the basis of the motion vector of the macroblock that minimizes the quantizer scale. As the quantizer scale decreases, a smaller value of the quantized frequency coefficient is stored in a storage region of the referenced area determiner 13. Accordingly, this is because when the numbers of quantized frequency coefficients having a non-zero value are the same, a macroblock having a smaller quantizer scale is more similar to the error macroblock.

In addition, if a plurality of macroblocks quantized using the same quantizer scale are present, the referenced area determiner 13 uses the absolute sum of the quantized frequency coefficients of each of the macroblocks as a third evaluation value. The referenced area determiner 13 may select a macroblock having a minimum third evaluation value, that is, a minimum sum of the quantized frequency coefficients. Thereafter, the referenced area determiner 13 computes a concealment vector on the basis of a motion vector of the macroblock having a minimum sum of the quantized frequency coefficients. This is because, as the sum of the quantized frequency coefficients decreases, the macroblock is more similar to the error macroblock. In this case, the referenced area determiner 13 may select a motion vector using the second and third evaluation values regardless of the first evaluation value.

The referenced area determiner 13 computes a concealment vector on the basis of the selected motion vector (operation S108).

After the processing in operation S102 or S108 is performed, the referenced area determiner 13 completes the concealment vector computing process.

Note that if the number of pairs of motion vectors extracted in operation S105 is not one, the referenced area determiner 13 may compute a concealment vector for each of the plurality of motion vectors that reference the error macroblock and select the most suitable concealment vector from among the computed concealment vectors.

For example, the referenced area determiner 13 may select, from among the concealment vectors, a concealment vector having a value of a component in the horizontal direction and a value of a component in the vertical direction being the closest to integer multiples of the sizes of the macroblock in the horizontal direction and the vertical direction. This is because as a value of a component in the horizontal direction and a value of a component in the vertical direction are closer to integer multiples of the sizes of the macroblock in the horizontal direction and the vertical direction, an area in which the error macroblock overlaps with the macroblock serving as a referenced area increases.

More specifically, as a fourth evaluation value, the referenced area determiner 13 computes a sum $\Delta$ of the amounts of shift of the value of a component in the horizontal direction and the value of a component in the vertical direction from a half size of the macroblock for each of the concealment vectors as follows:

$$\Delta = |\mathrm{mod}(MVCH, MBH) - MBH/2| + |\mathrm{mod}(MVCV, MBV) - MBV/2| \quad (3)$$

where a function mod(x, y) returns the remainder when x is divided by y, MVCH (Motion Vector Conceal Horizontal-direction) represents the value of a component of the concealment vector in the horizontal direction, MVCV (Motion Vector Conceal Vertical-direction) represents the value of a component of the concealment vector in the vertical direction, MBH (MacroBlock Horizontal-size) represents the size of a macroblock in the horizontal direction, and MBV (MacroBlock Vertical-size) represents the size of a macroblock in the vertical direction.

As the sum $\Delta$ of the amounts of shift increases, a value of a component of a concealment vector in the horizontal direction and a value of a component of the concealment vector in the vertical direction are closer to integer multiples of the sizes of the macroblock in the horizontal direction and the vertical direction. Accordingly, the referenced area determiner 13 selects the concealment vector that maximizes the fourth evaluation value, that is, the concealment vector that maximizes the sum $\Delta$ of the amounts of shift.

Note that if the motion vector has a precision smaller than one pixel, the referenced area determiner 13 may multiply each of the MVCH value, MVCV value, MBH value, and MBV value in equation (3) by a coefficient that makes the minimum unit of the motion vector an integer greater than or equal to 1 or more and compute the sum $\Delta$ of the amounts of shift. For example, when the precision of the motion vector is 0.5 pixels, the referenced area determiner 13 multiplies each of the MVCH value, MVCV value, MBH value, and MBV value by 2. When the precision of the motion vector is 0.25 pixels, the referenced area determiner 13 multiplies each of the MVCH value, MVCV value, MBH value, and MBV value by 4.

In addition, when the color difference signal of the error macroblock is recoverable and if the shapes of images included in macroblocks indicated by the concealment vectors are the same, it is desirable that, from among the macroblocks, a macroblock having a minimum difference in color from that of the error macroblock be selected for concealment. Therefore, the referenced area determiner 13 computes a difference between the color difference signal of each of the macroblocks and that of the error macroblock as a fifth evaluation value. Thereafter, the referenced area determiner 13 selects a concealment vector indicating a macroblock having a minimum fifth evaluation value, that is, a color difference signal having a minimum difference from that of the error macroblock.

Note that if it is determined that the error macroblock is similar to a macroblock in the vicinity of the error macroblock, the referenced area determiner 13 may compute a concealment vector so that the macroblock in the vicinity of the error macroblock serves as a referenced block even when a macroblock that references the error macroblock is present. For example, when the error macroblock is not in contact with another error macroblock and if the images in macroblocks in the vicinity of the error macroblock (e.g., 4 or 8 surrounding macroblocks) are similar to the image in the error macroblock, the referenced area determiner 13 computes a concealment vector so that the concealment vector indicates the macroblocks in the vicinity of the error macroblock.

The referenced area determiner 13 delivers, to the error concealment unit 14, the concealment vector MVC computed for the error macroblock, a macroblock address indicating the macroblock, and the identification number of a picture including the macroblock.

The error concealment unit 14 conceals the area in which an error occurred on a per macroblock basis using the information regarding the referenced area for concealment determined by the referenced area determiner 13. For example, the error concealment unit 14 sets each of the pixel values of the error macroblock to the pixel value of the corresponding macroblock of the referenced picture determined by the referenced area determiner 13. The error concealment unit 14 outputs the error macroblock subjected to the concealment process to the image integrator 17 together with the macroblock address of the error macroblock and the identification number of a picture including the macroblock.

The image decoder 15 decodes a partial area of a picture corresponding to the encoded data that has been variable-length decoded. To decode the partial area, for example, the image decoder 15 performs an inverse quantization process and an inverse orthogonal transformation process on the quantized frequency coefficients. In addition, if a difference signal is obtained through the inverse orthogonal transformation process, the image decoder 15 adds the difference signal to a predictive image obtained from a corresponding block of a referenced picture that is identified by the motion vector and that has already been decoded. Thus, the image decoder 15 decodes the partial area of the picture. The image decoder 15 decodes a macroblock included in each of the pictures in the order in which pictures are decoded in accordance with the GOP structure. At that time, each time a macroblock is decoded, the image decoder 15 outputs the decoded block to the image integrator 17 together with the macroblock address of the macroblock and the identification number of a picture including the macroblock. In addition, the image decoder 15 selects, from among decoded macroblocks, a macroblock included in a picture that may be referenced by a different picture when an encoding process is performed and stores the selected macroblock in the buffer memory 16. Note that a picture that may be referenced by a different picture is, for example, an I picture or a P picture.

The buffer memory 16 temporarily stores the motion vector received from the variable length decoder 11 and the macroblock of the decoded picture received from the image decoder 15 together with the identification number of the picture and the macroblock address of the macroblock. Thereafter, in response to a request received from the referenced area determiner 13, the buffer memory 16 outputs the motion vector to the referenced area determiner 13. In addition, in response to a request received from the error concealment unit 14, the buffer memory 16 outputs the decoded picture to the error concealment unit 14 on a per macroblock basis.

The image integrator 17 refers to the identification number of the picture and the macroblock address and arranges, in accordance with a predetermined order, the macroblocks decoded by the image decoder 15 and the macroblock subjected to the error concealment process performed by the error concealment unit 14 for the same picture. Thereafter, the image integrator 17 reproduces the pictures included in the video data. The image integrator 17 outputs the reproduced pictures in accordance with the order in which the pictures are played back.

Figure 6:
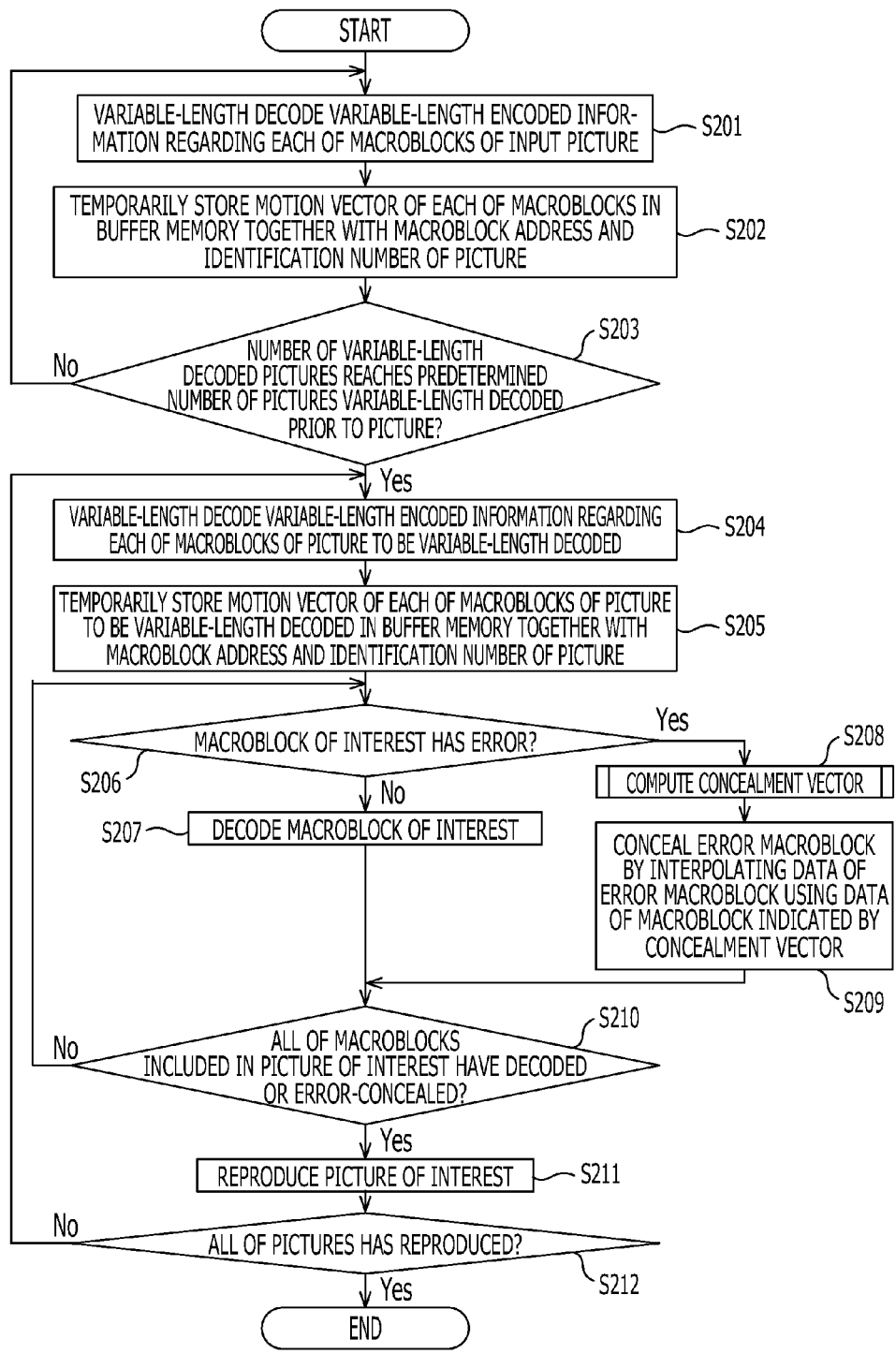
FIG. 6 is a flowchart of a video decoding process according to an embodiment.

FIG. 6 is a flowchart of a video decoding process performed by the video decoding device 1. Note that when the units of the video decoding device 1 are substituted with function modules realized by computer programs, the processing flow shown in FIG. 6 is controlled by a computer program running on a processor included in the video decoding device 1. After a predetermined initial amount of encoded video data is accumulated in the buffer memory 10, the video decoding device 1 sequentially inputs the data for one picture to the variable length decoder 11 in accordance with the order in which pictures are decoded. The variable length decoder 11 then variable-length decodes the variable-length encoded information of each of the macroblocks of the input picture (operation S201). Thereafter, the variable length decoder 11 delivers, to the error detector 12, the quantized frequency coefficient, the quantizer scale, and the motion vector of each of the macroblocks reproduced through the variable-length decoding. In addition, the variable length decoder 11 temporarily stores the motion vector of each of the macroblocks in the buffer memory 16 together with the macroblock address of the macroblock and the identification number of a picture including the macroblock (operation S202).

Subsequently, the video decoding device 1 determines whether the number of variable-length decoded pictures reaches the predetermined number of pictures to be variable-length decoded prior to the picture decoded by the image decoder 15 (operation S203). If the number of variable-length decoded pictures has not reached the predetermined number (No in operation S203), the processing performed by the video decoding device 1 returns to operation S201. However, if the number of variable-length decoded pictures has reached the predetermined number (Yes in operation S203), the variable length decoder 11 considers the subsequently input picture as a picture to be variable-length decoded. Thereafter, the variable length decoder 11 variable-length decodes the picture to be variable-length decoded (operation S204). Subsequently, the variable length decoder 11 delivers, to the error detector 12, the encoding data, such as a quantized frequency coefficient and a quantizer scale, of each of the macroblocks that has been reproduced through the variable-length decoding. In addition, the variable length decoder 11 temporarily stores the motion vector of each of the macroblocks in the buffer memory 16 together with the macroblock address of the macroblock and the identification number of a picture including the macroblock (operation S205).

Furthermore, the error detector 12 selects a first picture included in the input encoded video data as a picture of interest and determines whether an error has occurred in a macroblock of interest in the picture of interest (operation S206). If an error has not occurred in the macroblock of interest (No in operation S206), the error detector 12 delivers data regarding the macroblock of interest to the image decoder 15. The image decoder 15 then decodes the macroblock of interest (operation S207). Thereafter, the image decoder 15 delivers the decoded macroblock to the image integrator 17. In addition, the image decoder 15 selects, from among the decoded macroblocks, a macroblock that may be referenced by a different picture when the picture is encoded and stores the selected macroblock in the buffer memory 16.

However, if an error has occurred in the macroblock of interest (Yes in operation S206), the error detector 12 considers the macroblock as an error macroblock and sends information regarding the error macroblock to the referenced area determiner 13 and the error concealment unit 14. The information includes, for example, the macroblock address of the error macroblock and the identification number of a picture including the macroblock. Thereafter, the referenced area determiner 13 computes a concealment vector indicating a macroblock included in a different picture that has already been decoded or a different macroblock included in the picture of interest as a referenced area (operation S208). Note that the referenced area determiner 13 computes the concealment vector in accordance with the processing flow shown in FIG. 5. Thereafter, the referenced area determiner 13 delivers the concealment vector to the error concealment unit 14. The error concealment unit 14 performs interpolation on the data of the error macroblock using the data of the macroblock indicated by the concealment vector so that the error macroblock is concealed (operation S209). Subsequently, the error concealment unit 14 delivers the data of the concealed error macroblock and the macroblock address of the macroblock to the image integrator 17.

After the processing performed in operation S207 or S209 is completed, the video decoding device 1 determines whether data of all of the macroblocks included in the picture of interest has been input to the image integrator 17 (operation S210). If data of a macroblock that has not been input to the image integrator 17 is found (No in operation S210), the video decoding device 1 selects the macroblock as a macroblock of interest and repeats the processing in operations S206 to S210. However, data of all of the macroblocks included in the picture of interest has been input to the image integrator 17 (Yes in operation S210), the image integrator 17 reproduces the picture of interest (operation S211). Thereafter, the image integrator 17 outputs the reproduced picture of interest.

The video decoding device 1 determines whether all of the pictures included in the input encoded video data have been reproduced (operation S212). If a picture that has not been reproduced is found (No in operation S212), the video decoding device 1 selects, as the next picture of interest, a picture subsequent to the current picture of interest in the order in which the pictures are decoded. In addition, the video decoding device 1 selects, as the next picture to be variable-length decoded, a picture subsequent to the current picture to be variable-length decoded in accordance with the order in which the pictures are decoded. Thereafter, the video decoding device 1 repeats the processing in operations S204 to S212. However, all of the pictures included in the input encoded video data have been reproduced (Yes in operation S212), the video decoding device 1 completes the decoding process.

As described above, if an error has occurred in any one of pictures included in the input encoded video data, the video decoding device 1 extracts a motion vector of a different picture that references an area of the picture in which the error has occurred. Thereafter, the video decoding device 1 estimates an area of an already decoded picture corresponding to the area in which the error has occurred using the extracted motion vector and, subsequently, conceals the area in which the error has occurred using the data of the estimated area. In this way, the video decoding device 1 may accurately estimate the area of the different picture that is similar to the area in which the error has occurred. Accordingly, the video decoding device 1 may conceal the area in which the error has occurred so that the quality of the image is not degraded regardless of the size of the area in which the error has occurred and the motions of the image in the area in which the error has occurred and the areas in the vicinity of the area. In particular, the video decoding device 1 may identify a referenced area used for concealing the area in which the error has occurred by using the information regarding a picture other than the picture including the area in which the error has occurred. As a result, even when all the information regarding a picture is lost, the video decoding device 1 may appropriately conceal the lost picture.

Figure 7:
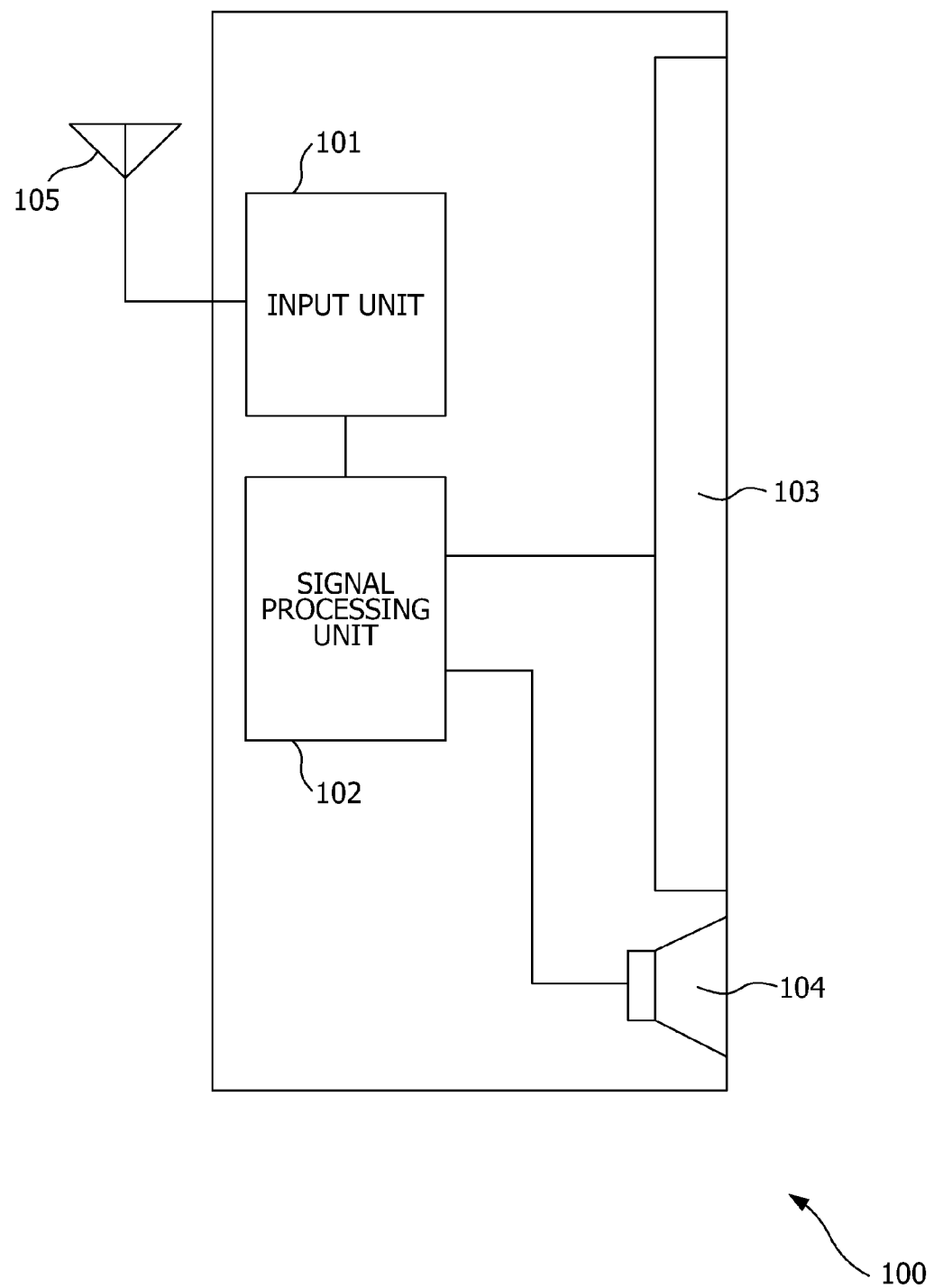
FIG. 7 is a block diagram of a video reproduction apparatus including the video decoding device according to the embodiment.

FIG. 7 is a block diagram of a video reproduction apparatus including the video decoding device 1 according to the above-described embodiment. As shown in FIG. 7, a video reproduction apparatus 100 includes an input 101, a signal processing unit 102, a display 103, and an audio output unit 104. The input 101 includes a circuit that is connected to, for example, an antenna 105 and that receives, via the antenna 105, a video signal transmitted using radio waves. The input 101 analog-to-digital converts the received video signal. Thereafter, the input 101 demodulates the digital video signal using a demodulation method in accordance with the modulation method of the carrier waves (e.g., the orthogonal frequency division multiplexing (OFDM) demodulation method). The input 101 performs an error correction process, such as a forward error correction process, on the demodulated video signal. Subsequently, the input 101 delivers the video signal subjected to the demodulation process and the error correction process to the signal processing unit 102.

The signal processing unit 102 includes, for example, one or more processors and peripheral circuits of the processor. The signal processing unit 102 decodes encoded video data and an encoded audio signal included in the video signal. Thereafter, the signal processing unit 102 delivers the decoded video data to the display 103. In addition, the signal processing unit 102 delivers the decoded audio signal to the audio output unit 104. The display 103 includes a display device, such as a liquid crystal display device. The display 103 displays the video data received from the signal processing unit 102. The audio output unit 104 includes a speaker. The audio output unit 104 outputs sounds from the speaker in accordance with the audio signal received from the signal processing unit 102.

FIG. 8 is a block diagram of the signal processing unit 102. As shown in FIG. 8, the signal processing unit 102 includes a demultiplexer 21, a video decoder 22, and an audio decoder 23.

The demultiplexer 21 separates the video signal into encoded video data and an encoded audio signal. Thereafter, the demultiplexer 21 delivers the encoded video data to the video decoder 22 on a per picture basis. In addition, the demultiplexer 21 delivers the encoded audio signal to the audio decoder 23. The video decoder 22 may be realized by using the video decoding device 1 according to the above-described embodiment. The video decoder 22 decodes the encoded video data received from the demultiplexer 21. At that time, if an error has occurs in any one of pictures included in the encoded video data, the video decoder 22 conceals the picture in which the error occurred in the above-described manner. Thereafter, the video decoder 22 delivers the decoded video data to the display 103.

The audio decoder 23 decodes the encoded audio signal received from the demultiplexer 21 using a decoding method corresponding to the encoding method. Examples of the encoding method include MPEG-2 Advanced Audio Coding (MPEG-2 AAC) and MPEG-4 AAC.

The video reproduction apparatus decodes video data included in a video signal using the video decoding device 1 according to the above-described embodiment. Accordingly, even when the condition under which the video signal is received is not good and, therefore, an error occurs in part of the video data included in the video signal, the video reproduction apparatus may prevent a decrease in quality of a reproduced image.

Note that the video decoding method according to the present embodiment may be realized by executing a predetermined program using a computer, such as a personal computer or a workstation. The video decoding program is recorded in a computer-readable recording medium, such as a hard disk, a flexible disk, a CD-ROM (compact disk-read only memory), a magneto-optical (MO) disk, or a digital versatile disc (DVD). The program is read from the recording medium by a computer and is executed by the computer. Alternatively, the video decoding program may be distributed via a network, such as the Internet.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A video decoding device comprising:
   a decoder configured to decode a plurality of separate partial areas of each of pictures included in encoded video data and a motion vector indicating a positional relationship between each of the partial areas and a partial area of a different picture referenced in order to encode the partial area;
   an error detector configured to detect, as an error area, a partial area that is unable to be decoded by the decoder from among the plurality of partial areas;
   a referenced area determiner configured to, when the error area is included in a first picture, determine, using the motion vector of a partial area included in a second picture that is subsequent to the first picture in the order in which the pictures are decoded, a referenced area of a third picture that has already been decoded, the referenced area corresponding to the error area;
   a concealment unit configured to conceal the error area using data included in the referenced area; and
   an image integrator configured to reproduce the first picture by arranging the concealed error area and the decoded partial areas included in the first picture in a predetermined order.

2. The device according to claim 1,
wherein the decoder decodes the motion vector of each of the partial areas of the second picture before decoding the partial areas of the first picture.

3. The device according to claim 1,
wherein the partial area of the second picture is encoded using a backward motion vector that references the error area included in the first picture and a forward motion vector that references a predetermined area included in the third picture, and
wherein the referenced area determiner computes a vector corresponding to a difference between the backward motion vector and the forward motion vector as a concealment vector that indicates a relative position of the referenced area with respect to the error area and considers the predetermined area as the referenced area.

4. The device according to claim 1,
wherein the partial area of the second picture is encoded using the forward motion vector that references the error area included in the first picture, and wherein the referenced area determiner computes a concealment vector that indicates a relative position of the referenced area with respect to the error area by multiplying the forward motion vector by a ratio of a second distance between the first picture and the third picture to a first distance between the first picture and the second picture and considers the predetermined area as the referenced area.

5. The device according to claim 1,
wherein, when a partial area of a fourth picture encoded using a backward motion vector that references the error area included in the first picture and a forward motion vector that references a predetermined area included in the third picture and a partial area of a fifth picture encoded using a forward motion vector that references the error area included in the first picture are present, the referenced area determiner computes a vector corresponding to a difference between the backward motion vector relating to the partial area of the fourth picture and the forward motion vector that references the predetermined area included in the third picture as a concealment vector that indicates a relative position of the referenced area with respect to the error area and considers the predetermined area as the referenced area.

6. The device according to claim 1,
wherein, when a plurality of motion vectors that reference the error area are present, the referenced area determiner determines the referenced area on the basis of, among the motion vectors that reference the error area, a motion vector having an amount of shift between a partial area encoded using the motion vector and the error area in a picture, the amount being the closest to an integer multiple of a size of the error area.

7. The device according to claim 1,
wherein, when a plurality of motion vectors that reference the error area are present, the referenced area determiner computes, for each of the motion vectors, an evaluation value representing a difference between a partial area encoded using the motion vector and the error area and determines the referenced area on the basis of the motion vector that minimizes the evaluation value.

8. The device according to claim 7,
wherein the partial area encoded using each of the plurality of motion vectors that reference the error area includes, as encoded data, a plurality of quantized frequency coefficients obtained by quantizing a plurality of frequency coefficients obtained by frequency-converting a difference image between the error area and the partial area using a predetermined quantization width, and
wherein the evaluation value is a sum of the number of non-zero quantized frequency coefficients among the quantized frequency coefficients included in the encoded data of a partial area corresponding to each of the motion vectors.

9. The device according to claim 7,
wherein the partial area encoded using each of the plurality of motion vectors that reference the error area includes, as encoded data, a plurality of quantized frequency coefficients obtained by quantizing a plurality of frequency coefficients obtained by frequency-converting a difference image between the error area and the partial area using a predetermined quantization width, and wherein the evaluation value is a sum of absolute values of quantized frequency coefficients included in the encoded data of a partial area corresponding to each of the motion vectors.

10. A video reproduction apparatus comprising:
an input configured to receive a video signal including encoded video data;
a demultiplexer configured to separate the encoded video data from the video signal;
a video decoding device configured to decode a plurality of pictures included in the encoded video data, the video decoding device comprising:
a decoder configured to decode a plurality of separate partial areas of each of pictures included in the encoded video data and a motion vector indicating a positional relationship between each of the partial areas and a partial area of a different picture referenced in order to encode the partial area;
an error detector configured to detect, as an error area, a partial area that is unable to be decoded by the decoder from among the plurality of partial areas;
a referenced area determiner configured to, when the error area is included in a first picture, determine, using the motion vector of a partial area included in a second picture that is subsequent to the first picture in the order in which the pictures are decoded, a referenced area of a third picture that has already been decoded, where the referenced area corresponds to the error area;
a concealment unit configured to conceal the error area using data contained in the referenced area; and
an image integrator configured to reproduce the first picture by arranging the concealed error area and the decoded partial areas included in the first picture in a predetermined order; and
a display configured to display a plurality of decoded pictures in accordance with an order in which the pictures are played back.

11. The apparatus according to claim 10,
wherein the decoder decodes the motion vector of each of the partial areas of the second picture before decoding the partial areas of the first picture.

12. The apparatus according to claim 10,
wherein the partial area of the second picture is encoded using a backward motion vector that references the error area included in the first picture and a forward motion vector that references a predetermined area included in the third picture; and
wherein the referenced area determiner computes a vector corresponding to a difference between the backward motion vector and the forward motion vector as a concealment vector that indicates a relative position of the referenced area with respect to the error area and considers the predetermined area as the referenced area.

13. The apparatus according to claim 10,
wherein the partial area of the second picture is encoded using the forward motion vector that references the error area included in the first picture; and wherein the referenced area determiner computes a concealment vector that indicates a relative position of the referenced area with respect to the error area by multiplying the forward motion vector by a ratio of a second distance between the first picture and the third picture to a first distance between the first picture and the second picture and considers the predetermined area as the referenced area.

14. A video decoding method comprising:
decoding a plurality of separate partial areas of each of pictures included in encoded video data and a motion vector indicating a positional relationship between each of the partial areas and a partial area of a different picture referenced in order to encode the partial area;
detecting, as an error area, a partial area that is unable to be decoded from among the plurality of partial areas;
determining a referenced area of a third picture that has already been decoded, the referenced area corresponding to the error area, when the error area is included in a first picture, using the motion vector of a partial area included in a second picture that is subsequent to the first picture in the order in which the pictures are decoded;
concealing the error area using data included in the referenced area; and
reproducing the first picture by arranging the concealed error area and the decoded partial areas included in the first picture in a predetermined order.

15. The method according to claim 14,
wherein the decoding a plurality of separate partial areas and motion vectors involves decoding the motion vector of each of the partial areas of the second picture before decoding the partial areas of the first picture.

16. The method according to claim 14,
wherein the determining a referenced area involves encoding the partial area of the second picture using a backward motion vector that references the error area included in the first picture and a forward motion vector that references a predetermined area included in the third picture, computing a vector corresponding to a difference between the backward motion vector and the forward motion vector as a concealment vector that indicates a relative position of the referenced area with respect to the error area, and considering the predetermined area as the referenced area.

17. The method according to claim 14,
wherein the determining a referenced area involves encoding the partial area of the second picture using a forward motion vector that references the error area included in the first picture, computing a concealment vector that indicates a relative position of the referenced area with respect to the error area by multiplying the forward motion vector by a ratio of a second distance between the first picture and the third picture to a first distance between the first picture and the second picture, and considering the predetermined area as the referenced area.

18. A non-transitory computer-readable recording medium storing a video decoding program that causing a computer to execute a process comprising:
decoding a plurality of separate partial areas of each of pictures included in encoded video data and a motion vector indicating a positional relationship between each of the partial areas and a partial area of a different picture referenced in order to encode the partial area:
detecting, as an error area, a partial area that is unable to be decoded from among the plurality of partial areas;
determining a referenced area of a third picture that has already been decoded, the referenced area corresponding to the error area, when the error area is included in a first picture, using the motion vector of a partial area included in a second picture that is subsequent to the first picture in the order in which the pictures are decoded;

concealing the error area using data included in the referenced area; and reproducing the first picture by arranging the concealed error area and the decoded partial areas included in the first picture in a predetermined order.

19. The non-transitory computer-readable recording medium according to claim 18, wherein decoding a plurality of separate partial areas and motion vectors involves decoding the motion vector of each of the partial areas of the second picture before decoding the partial areas of the first picture.

20. The non-transitory computer-readable recording medium according to claim 18, wherein determining a referenced area involves encoding the partial area of the second picture using a backward motion vector that references the error area included in the first picture and a forward motion vector that references a predetermined area included in the third picture, computing a vector corresponding to a difference between the backward motion vector and the forward motion vector as a concealment vector that indicates a relative position of the referenced area with respect to the error area, and considering the predetermined area as the referenced area.

* * * * *